US007814759B2

(12) United States Patent
Rozzi et al.

(10) Patent No.: US 7,814,759 B2
(45) Date of Patent: Oct. 19, 2010

(54) METHOD FOR CONTROLLING SYSTEM TEMPERATURE

(75) Inventors: James A. Rozzi, Houston, TX (US); Montgomery C. McGraw, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

(21) Appl. No.: 12/153,406

(22) Filed: May 19, 2008

(65) Prior Publication Data

US 2008/0304232 A1 Dec. 11, 2008

Related U.S. Application Data

(60) Provisional application No. 60/942,497, filed on Jun. 7, 2007.

(51) Int. Cl.
*F25D 23/12* (2006.01)
*H05K 5/00* (2006.01)
*H05K 7/20* (2006.01)
*G06F 1/20* (2006.01)

(52) U.S. Cl. ............... 62/259.2; 361/679.48; 361/694; 361/695

(58) Field of Classification Search ............ 62/259.2; 236/49.3; 361/679.48, 694, 695
See application file for complete search history.

(56) References Cited

U.S. PATENT DOCUMENTS

| 6,583,989 | B1 * | 6/2003 | Guyer et al. ............ 361/724 |
| 6,791,836 | B2 * | 9/2004 | Cipolla et al. .......... 361/679.48 |
| 2003/0193777 | A1 * | 10/2003 | Friedrich et al. ......... 361/687 |

* cited by examiner

*Primary Examiner*—Chen-Wen Jiang

(57) ABSTRACT

A computer-implemented method for cooling a modular computer system having multiple cooling devices and multiple heat-generating modules is disclosed. The method includes the steps of determining the number of cooling device installed in the system; determining the positions of the installed cooling devices; applying predefined cooling device placement rules and signaling an error condition if a cooling device is in an unacceptable location; determining locations of all installed heat-generating modules; and applying the predefined cooling device placement rules and signaling an error condition if an installed heat-generating module is in an unacceptable location.

12 Claims, 4 Drawing Sheets

METHOD FOR CONTROLLING SYSTEM TEMPERATURE

CROSS REFERENCE TO RELATED APPLICATION(S)

This application claims priority from U.S. Provisional Application 60/942,497 filed Jun. 7, 2007 entitled "ENFORCEMENT OF FAN/SERVER POSITION/PLACEMENT RULES TO ENSURE PROPER COOLING OF A BLADE BASED COMPUTING SYSTEM" the content of which is incorporated herein in its entirety to the extent that it is consistent with this invention and application.

BACKGROUND

Computer system components, such as central processing units (CPUs), chipset, graphics cards, and hard drives, produce large amounts of heat during operation. This heat must be dissipated in order to keep these components within safe operating temperatures. Overheated components generally exhibit a shorter life-span and may also cause malfunction of the computer system.

The risk of overheating increases with increasing density of computer system components. In a typical blade server, a large number of heat generating blades may be closely placed in a single system enclosure. Limited open space in the system enclosure results in reduced air circulation and correspondingly reduced heat dissipation.

SUMMARY

A computer-implemented method for cooling a modular computer system is disclosed. The modular computer system includes multiple cooling devices and multiple heat-generating modules. The computer-implemented method includes the steps of: determining the number of cooling devices installed in the modular computer system; determining the positions of the installed cooling devices; applying predefined cooling device placement rules and signaling a cooling device placement error condition if a cooling device is in an unacceptable location; determining locations of all installed heat-generating modules; and applying the predefined cooling device placement rules and signaling a heat-generating module placement error condition if an installed heat-generating module is in an unacceptable location.

BRIEF DESCRIPTION OF DRAWINGS

The detailed description will refer to the following drawings, wherein like numerals refer to like elements, and wherein.

DETAILED DESCRIPTION

Figure 1:
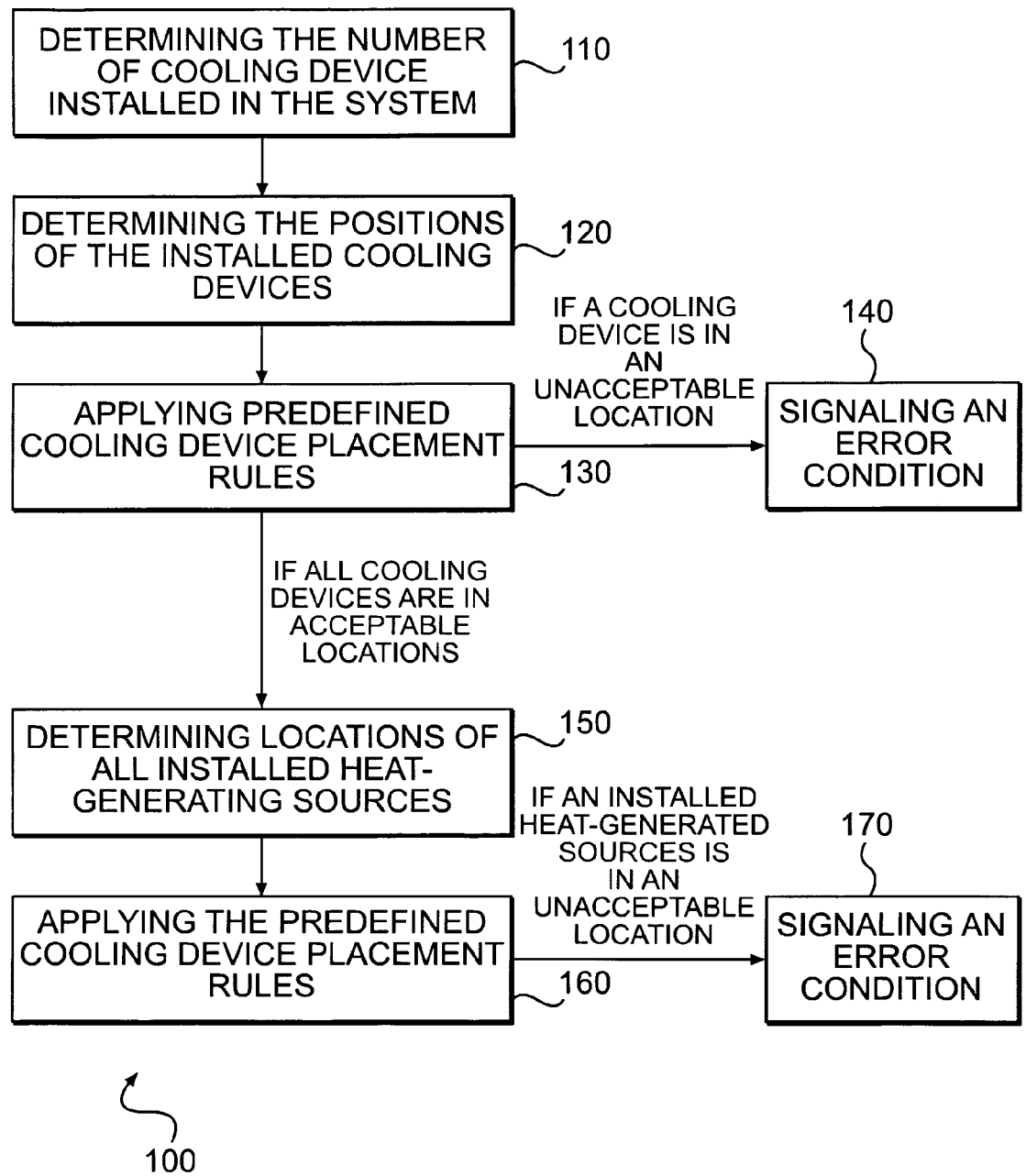
FIG. 1 is a flow diagram showing an embodiment of a method for controlling system temperature.

A method for cooling a modular computer system having multiple cooling devices and multiple heat-generating sources is disclosed. Referring to FIG. 1, in an embodiment, a method 100 for controlling system temperature includes the steps of determining (110) the number of cooling devices installed in the system; determining (120) the positions of the installed cooling devices; applying (130) predefined cooling device placement rules; signaling (140) an error condition if a cooling device is in an unacceptable location; determining (150) locations of all installed heat-generating sources; applying (160) the predefined cooling device placement rules; and signaling (170) an error condition if an installed heat-generating source is in an unacceptable location. The method 100 permits thermal management of all the installed heat-generating sources so that the heat-generating sources do not create an unacceptable thermal environment. The method 100 also allows a user to operate a modular computer system without fully populating all locations for cooling devices or modules, thereby giving the user expandability to handle future computing needs while avoiding up front expenditures.

A cooling device can be any cooling device that is capable of delivering a specific maximum CFM (cubic feet per minute) value of airflow. The maximum value of airflow is determined by a thermodynamic analysis of the of the computer enclosure and verified experimentally to ensure that the designated airflow value can always cool the computer enclosure.

The heat-generating sources can be any computer system device or module that produces heat when energized or otherwise in operation. In an embodiment, the modular computer system is a blade system and the heat-generating sources include blades, I/O modules, and management modules.

In order to control temperature within the modular computer system enclosure, the method 100 of FIG. 1 involves certain cooling device placement rules. The cooling device placement rules are a set of predefined rules that regulate the location of the cooling devices and the location of the heat-generating sources. For a given number of installed cooling devices, the cooling device placement rules provide for acceptable locations of the cooling devices in the modular computer system, and for acceptable locations of heat-generating sources based on the locations of the cooling devices. In an embodiment, the cooling device rules provide one or more allowable cooling device configurations for each specific number of installed cooling devices, and one or more allowable heat-generating module configurations for each allowable cooling device configuration. The result is a multiplicity of acceptable cooling device placement rules. The modular computer system will select a cooling device placement rule to enforce by first selecting a set of cooling device placement rules based on the number of installed cooling devices in the modular computer system and then selecting a cooling device placement rule based on actual locations of the installed cooling devices. The modular computer system will then enforce the selected cooling device placement rule by determining whether all installed heat-generating sources are in the locations acceptable to the selected cooling device placement rule. The modular computer system will signal an error condition if an installed heat-generating source is in an unacceptable location.

The acceptable cooling device configurations and acceptable heat-generating source configurations are designed to provide optimal cooling for the modular computer system. The optimal positions for cooling devices to cool a specific heat-generating module are unique to a specific computer system design, and are typically determined through experimentation in a controlled temperature environment. Therefore, the acceptable positions of cooling devices corresponding to each specific number of cooling devices, and the acceptable positions of heat-generating modules corresponding to each configuration of cooling devices are system specific. However, once the acceptable positions are determined for a specific system, the acceptable positions will remain the same, regardless of the actual environmental circumstances in which the computer system is operating.

Figure 2:
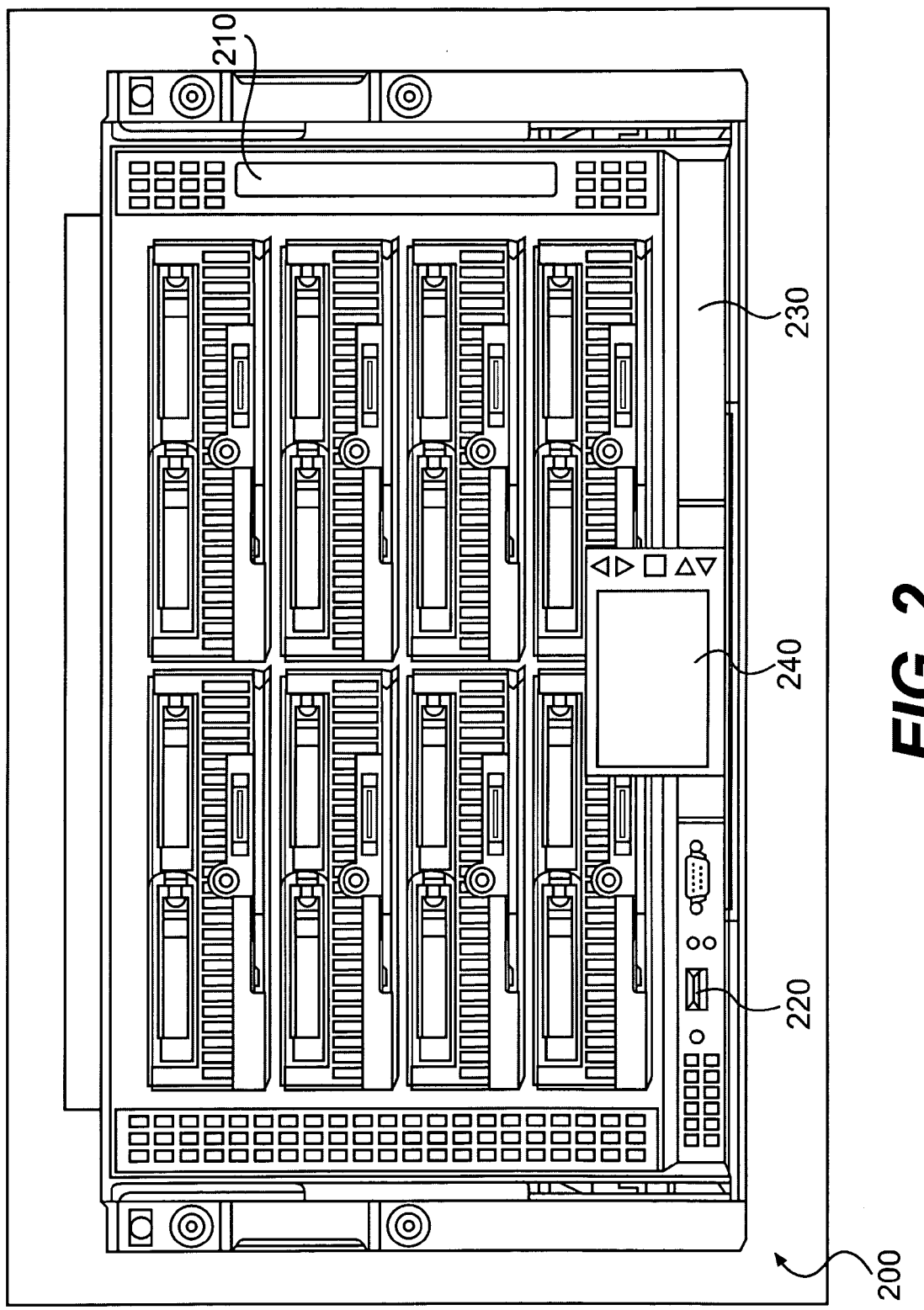
FIG. 2 is a schematic showing front components of a blade system.
Figure 3:
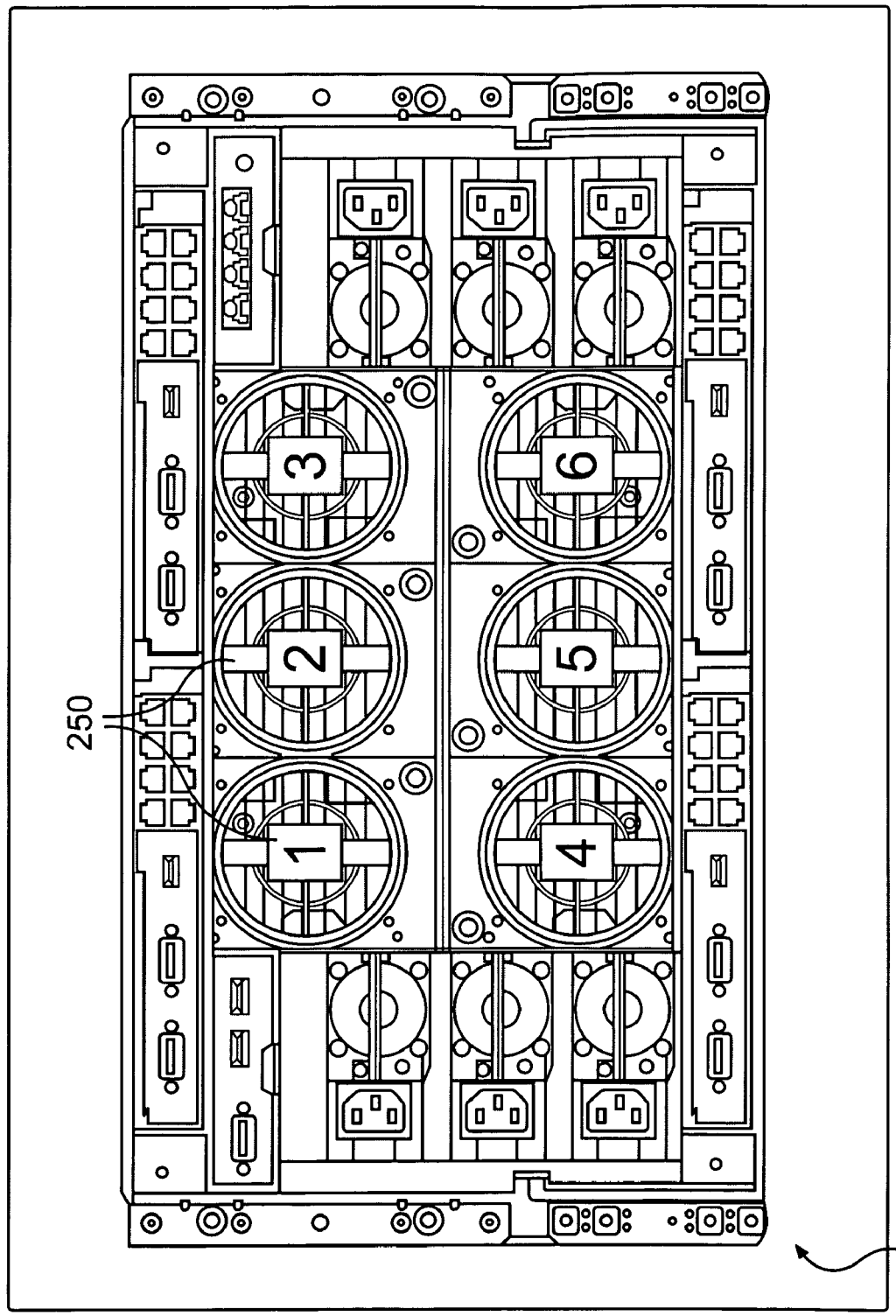
FIG. 3 is a schematic showing numbered fan bays at the back of the blade system of FIG. 2. The fan bays are marked as number 1 to 6.
Figure 4:
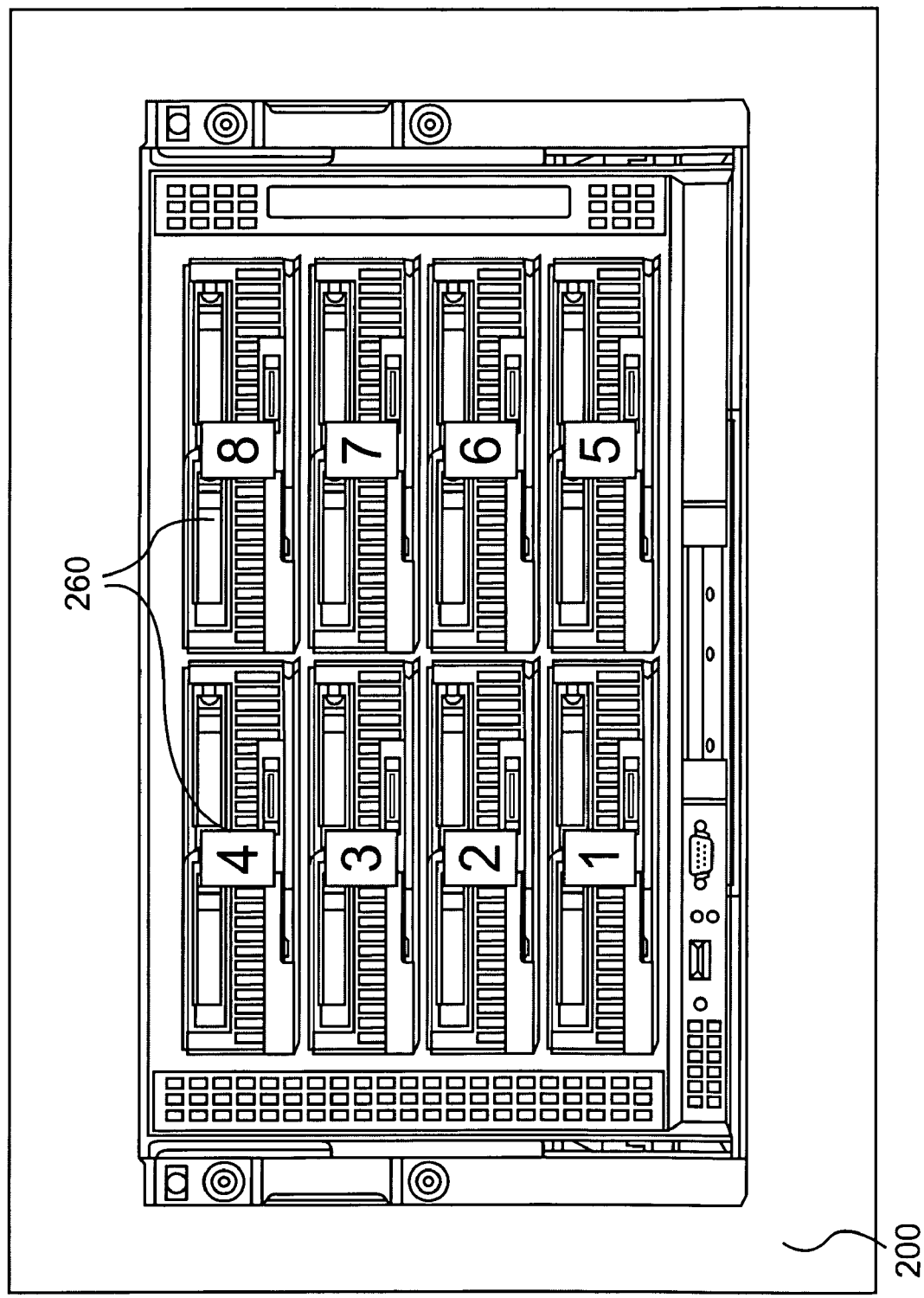
FIG. 4 is a schematic showing numbered blade bays at the front of the blade system of FIG. 2. The blade bays are marked as number 1 to 8.

FIGS. 2-4 show an exemplary blade system 200. FIG. 2 depicts the front components of the blade system 200, which include a DVD drive slot 210, onboard administrator 220, additional onboard administrate tray 230, and a display 240.

As shown in FIGS. 3 and 4, the blade system 200 includes multiple cooling fan bays 250 at the back of the system enclosure (FIG. 3) and multiple blade bays 260 at the front of the system enclosure (FIG. 4). The position of each fan bay 250 or each blade bay 260 is identified by a number (e.g., number 1-6 for the fan bays and number 1-8 for the blade bays). Not all the fan bays or blade bays need to be occupied all the time. In an embodiment, a control program is programmed with fan placement rules for any combination of less than the full compliment of fans. The fan placement rules for a specific number of fans specify which positions those fans must occupy, how many blades can be installed and which positions are available for blade installation. The control program monitors the blade system enclosure for total number of fans and their placements. If a fan is misplaced, the control program will signal to the user that there is a fan placement error condition. In one embodiment, the fan placement rules require an even number of fans to be installed. If an odd number (X) of fans are installed, one of the fans will be ignored, and the fan placement rule enforced by the control program will be the fan placement rule for (X−1) fans. Typically, the ignored fan is the fan located in a position that does not pair geometrically with any other fans. For example, if five fans are installed in fan bays 1-5, the fan in fan bay 5 will be ignored. In this situation, extra fans can be installed in any "empty" fan bay without triggering an error condition.

Once the control program determines which fan placement rule to enforce, the control program determines the number of blades that may be installed in the blade system to ensure that the number does not exceed the maximum number of blades allowed by the fan placement rule, and that the installed blades are in acceptable locations. If a specific fan placement rule is in effect and a blade is inserted into an invalid location, the control program will not permit the blade to be powered on. The control program will also signal to the user that a blade is in an improper location and should be moved. In an embodiment, the fan placement rules include a rule that allows blades to be installed in any available location, if the maximum number of fans supported by the modular computer system is installed.

In another embodiment, the control program signals to the user through an integrated Liquid Crystal Display (LCD) and/or a one or more Graphical User Interface (GUI) which may operate on a remote system, or be displayed on the LCD.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

We claim:

1. A computer-implemented method for cooling a modular computer system having multiple cooling devices and multiple heat-generating modules, comprising:
   determining the number of cooling devices installed in the modular computer system;
   determining the positions of the installed cooling devices;
   applying predefined cooling device placement rules and signaling a cooling device placement error condition if a cooling device is in an unacceptable location;
   determining locations of all installed heat-generating modules; and
   applying the predefined cooling device placement rules and signaling a heat-generating module placement error condition if an installed heat-generating module is in an unacceptable location.

2. The method of claim 1, wherein said modular system is a blade system.

3. The method of claim 2, wherein said cooling devices comprise cooling fans.

4. The method of claim 2, wherein said heat-generating modules comprise blades, I/O modules, and management modules.

5. The method of claim 1, wherein said step of applying predefined cooling device placement rules comprises the steps of:
   selecting a subset of predefined cooling device placement rules based on the number of cooling devices installed in the system;
   selecting a predefined cooling device placement rule from the subset of predefined cooling device placement rules based on the locations of all installed cooling devices.

6. The method of claim 5, wherein the step of applying the predefined cooling device placement rules comprises the step of:
   determining whether the number of installed heat-generating modules exceeds the maximum number acceptable to the selected predefined cooling device placement rule; and
   determining whether all heat-generating modules are installed in locations acceptable to the selected predefined cooling device placement rule.

7. The method of claim 1, wherein a heat-generating module installed in an unacceptable location is prevented from being powered on.

8. The method of claim 1, wherein the cooling device placement rules require an even number of cooling devices to be installed.

9. The method of claim 8, wherein said step of applying predefined cooling device placement rules comprises the steps of:

if an odd number of cooling devices are installed, ignoring one cooling device; and selecting a subset of predefined cooling device placement rules based on the number of un-ignored cooling devices installed in the system.

10. The method of claim 9, wherein the ignored cooling device is a cooling device that does not form a geometric pair with another cooling device.

11. The method of claim 1, wherein said cooling device placement rule includes a rule that allows heat-generating modules to be installed in any available location, if the number of installed cooling devices is the maximum number of cooling devices supported by the modular computer system.

12. A computer readable media comprising computer code for implementing a method for cooling a modular computer system having multiple cooling devices and multiple heat-generating modules, said method comprising the steps of:

determining the number of cooling devices installed in the modular computer system;

determining the positions of the installed cooling devices;

applying predefined cooling device placement rules and signaling a cooling device placement error condition if a cooling device is in an unacceptable location;

determining locations of all installed heat-generating modules; and applying the predefined cooling device placement rules and signaling a heat-generating module placement error condition if an installed heat-generating module is in an unacceptable location.

* * * * *